Jan. 16, 1962    D. E. CLEARY    3,016,894
BARBECUE POST
Filed April 16, 1959    2 Sheets-Sheet 1
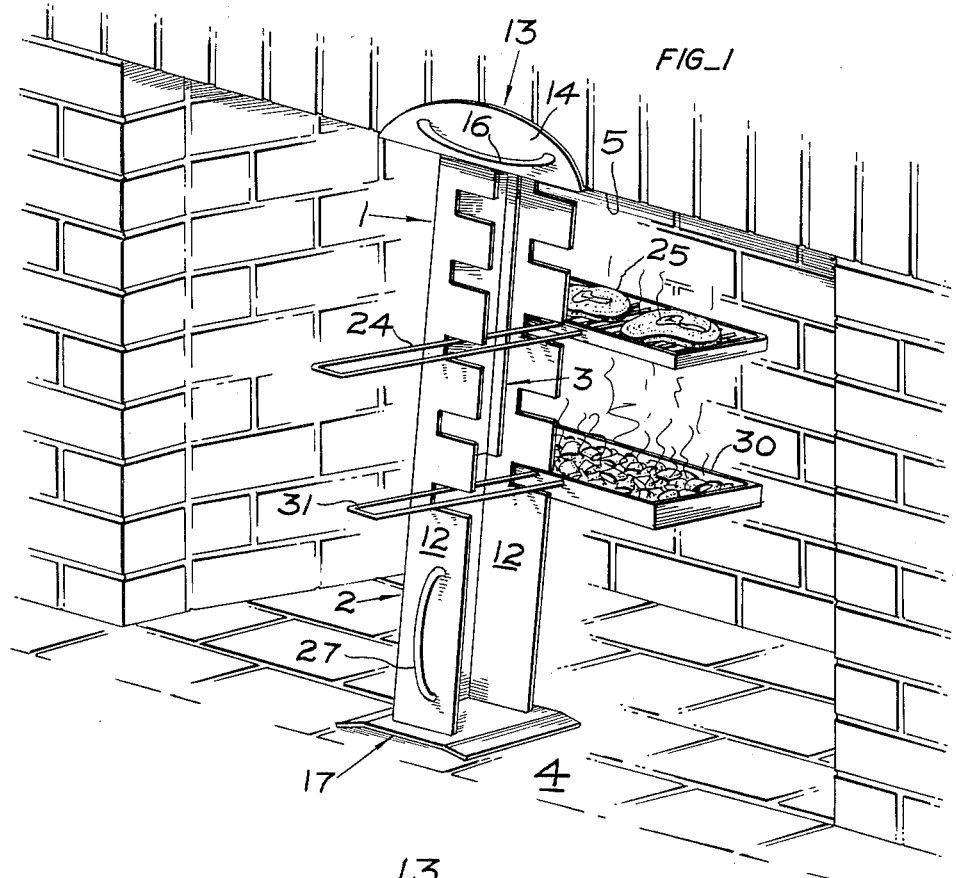
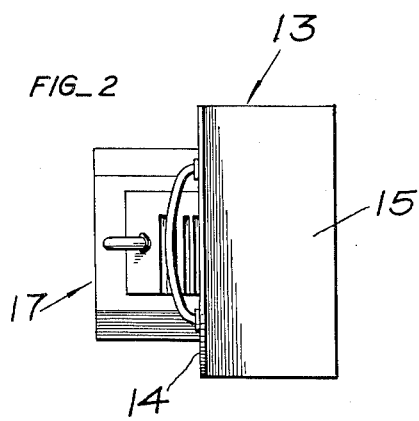
INVENTOR.
DENNIS E. CLEARY
BY
*Boyken, Mohler & Wood*
ATTORNEYS Jan. 16, 1962 D. E. CLEARY 3,016,894
BARBECUE POST
Filed April 16, 1959 2 Sheets-Sheet 2
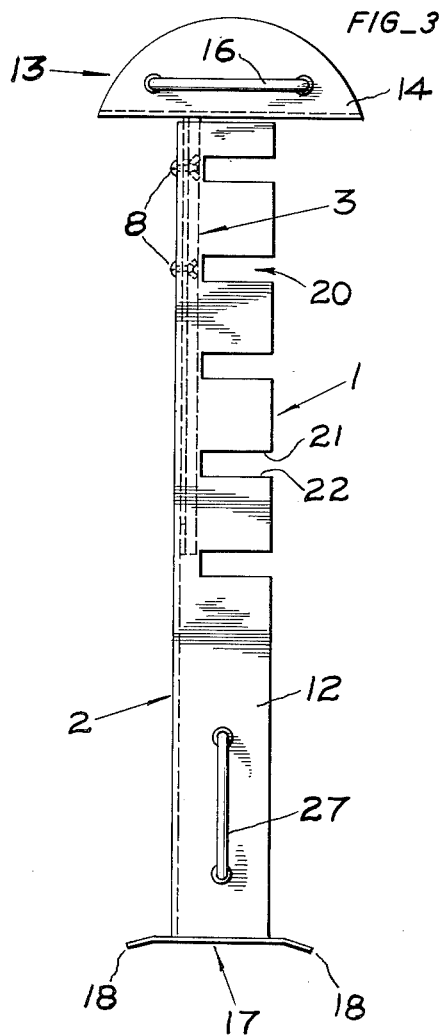
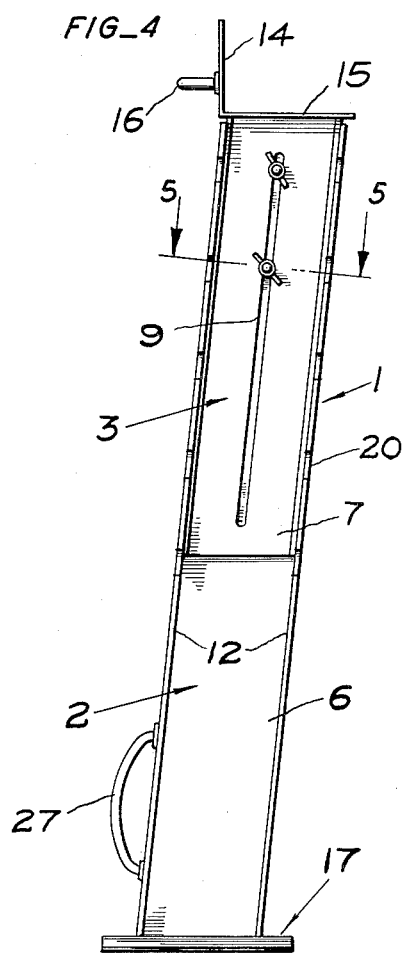
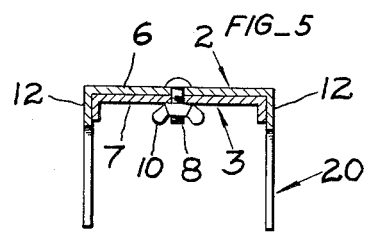
INVENTOR.
DENNIS E. CLEARY
BY
Boykin, Mohler & Wood
ATTORNEYS

United States Patent Office 3,016,894
Patented Jan. 16, 1962

3,016,894
BARBECUE POST
Dennis E. Cleary, Centre St., Dennisport, Mass.
Filed Apr. 16, 1959, Ser. No. 806,929
3 Claims. (Cl. 126—137)

This invention relates to a device adapted to support a food holder, such as a barbecue grill, pan and the like, within a fireplace for cooking whatever food is supported on or by the holder.

One of the objects of the invention is the provision of a simple, economically made, strong, and compact device that is adapted to be removably held between the the upper and lower sides of the forward portion of a fireplace for removably holding the elongated, laterally projecting handle on a food holder, barbecue grill, pan, or the like with such holder, grill or pan disposed within the fireplace and at the desired level over coals within the fireplace.

Another object of the invention is the provision of a vertically extending post adapted to cooperate with a fireplace for supporting a conventional barbecue grill, pan or the like, having an elongated handle projecting laterally therefrom, by said handle, at any desired level within said fireplace and over coals in the latter, and which grill, pan or the like may be readily removed from the post and from said fireplace, and re-positioned at a different level within the fireplace for broiling or cooking food supported on said grill, pan, holder or the like.

An added object is the provision of a simple post adapted to be firmly, but releasably, held at the forward side of a fireplace, in a substantially vertically extending position, in combination with means for so supporting said post and means for removably and adjustably holding one or a pair of holders on said post spaced or offset to a side thereof within said fireplace. In the case of one holder being used it would constitute a food holder adapted to support meat or other food at a desired distance over coals in such fireplace, and where a pair of holders are used, the said food holder is used, but a fuel holder is also used and is supported by said post in a position the desired distance below said food holder. Such fuel holder may constitute a conventional pan or grate adapted to support charcoal thereon, and which pan or grate has a laterally elongated handle projecting therefrom for manual manipulation and for engagement with the post.

In the broiling or barbecuing of meat, and in cooking other food, one of the most simple devices employed is a conventional pair of open grills of corresponding size hinged together along one of their edges for opening and closing like a book, with laterally elongated handles projecting from the edges that are opposite to the hinged edges. The meat is clamped between the grills and when so clamped, the latter, with the meat therebetween, are held over the coals by a person grasping the handles respectively, to support the food and to carry away the fumes of the food and fuel.

The present invention is usable at any time, although during the winter months when it is impossible to do outdoor cooking in comfort, and when the fireplace in the house is normally in operation, it enables the user to quickly have all of the conveniences and advantages of a specially constructed barbecue installation without necessitating the expense and space required therefor. A conventional long handled grill or rack and a simple post of the structure hereafter described is all that is required. When the fireplace is not being used, the addition of a long handled charcoal pan may be added. The post may be installed in the proper place in the matter of a few seconds without injuring or defacing the fireplace and without the use of jack screws, clamps and the like, and can be received in a second's time and stored away, virtually taking up on more room than a relatively short length of pipe. It may be readily adapted to any fireplace of ordinary structure as used in homes, and is strong and economical to make.

Other objects and advantages will appear in the description and in the drawings.

FIG. 1 is an isometric view showing the device in position in a fireplace supporting a food holder and a fuel holder.

FIG. 2 is a top plan view of the device shown in FIG. 1.

FIG. 3 is a front elevational view of the device shown in FIG. 1 as seen from outside the fireplace.

FIG. 4 is a side elevational view of the device of FIG. 3 as seen from the right hand side of the latter.

FIG. 5 is a sectional view as seen along line 5—5 of FIG. 4.

In detail, the form of the invention herein illustrated comprises an elongated post, generally designated 1, that has a lower section 2 and an upper section 3. These sections are channel strips telescopically fitting one within the other, for relative movement longitudinally thereof to enable shortening or lengthening the post to accommodate the post to fireplaces of different heights vertically across the front opening between the floor 4 and the upper edge 5 of said opening. The sides of channel strip 3 are quite narrow as compared with those of strip 2 (FIG. 5).

The words "forward," "forwardly," "front" and "rear," "rearwardly" and words of similar import are used with reference to the front and rear sides of a fireplace. Hence a rearwardly projecting member would be directed toward or extend toward the rear or back wall of a fireplace, and the opposite would be true of a "forwardly" projecting member. Also the "upper" end of the channel strip 1 is the uppermost end of the upper section 3, while the lower end would be the lowermost end of the lower section 2.

Section 2 is preferably longer than section 3. However, the present invention is not restricted to any particular size or degree of overlap of sections 2, 3.

The bottom plates 6, 7 of sections 2, 3 may be substantially in engaging relation for releasably locking the sections together at different degrees of extension by one or more bolts 8 carried by one of the bottom plates 6, 7 and extending through a slot 9 formed in the bottom plate of the other section and extending longitudinally of said bottom plate. A finger actuatable nut 10 on each bolt 8 provides means for tightening the sections in their adjusted positions. Preferably the bottom plate of the lower section is slotted and the bolt is carried by the upper section.

The side plates 12 of the lower section 2 may be relatively wide, and relatively widely spaced apart. As an example, they may be substantially 3 inches in width, and bottom plate 6 may also be approximately 3 inches in width to space the side plates 12 the latter distance.

Secured rigidly on the upper end of the upper section 3 is a horizontally extending right angle member 13, having a vertically disposed side 14 and a horizontally disposed side 15. The latter extends across the upper end of upper section 3 and may be welded or otherwise suitably secured to said upper section. Preferably this member extends parallel to the side plates of the upper member and projects equal distances from the free lateral edges of the side plates and from the bottom plate of the strip comprising the upper section.

The surface of the vertical side or wall 14 that faces away from the fireplace may be provided with a handle 16 that is adapted to be grasped by the hand of the user.

Secured to the lower end of the lower section 2 and extending thereacross is a generally bowed leaf spring 17 that has its concave side facing downwardly, and the lowermost side edges 18 are disposed along lines that are at right angles to the lower edges of the side plates 12 of section 2.

This structure enables yieldably securing the post in the fireplace at its forward side, as will later be explained.

The side plates 12 of the section 2 are formed with laterally opening slots or recesses 20. These are arranged in pairs of horizontally aligned slots, one being in one side and the other being in the other side at the same levels. The upper and lower edges 21, 22 of each recess or slot is preferably horizontal, and the space between said edges is such that the handle 24 projecting horizontally from one side of a food holder 25 may be slipped laterally into each pair of horizontally aligned slots, and the handle will then project from one of the side plates of the post with the holder 25 remote from the post.

It has been mentioned that this holder 25 and the handle may be conventional, the latter being one or a pair of extensions respectively connected with the grills of a pair thereof that are hingedly connected along the edges opposite to the handle for swinging apart, and for holding meat therebetween when swung together and held against swinging apart. A single handle rack is shown in the drawing.

In the present instance, the form of holder shown in the drawings has a handle that is wider in the horizontal plane of the holder or grill, than at right angles thereto, hence when the handle is inserted into a pair of aligned recesses 20, the holder will not rotate, but will remain horizontal, irrespective of the distribution of weight on the holder. The handle, as shown, rests against the lower edge 22 of the recess in side plate 12 that is nearest the fireplace, while it rests against edge 21 in the recess remote from the fireplace and against the horizontally spaced closed ends of the recesses in both side plates.

In operation, the user initially adjusts the post so that it will extend substantially vertically between the floor 4 of the fireplace opening at the forward portion thereof and the upper edge or side 5 of said opening. However, this adjustment is preferably made so that the upper end slants slightly inwardly in a direction into the fireplace when the lower side 15 of the angle member 13 is tightly against the edge or under side 15 of the fireplace opening, and the spring 17 is flattened out somewhat against the floor 4 and thus yieldably urges the side 15 into engagement with the upper side of the fireplace opening. The vertical wall 14 will be substantially in engagement with the forwardly facing side of the fireplace adjacent to the opening therein.

To place the post in this position, it is only necessary to initially position the angle stop over the lower forward corner of the upper side of the fireplace opening and to thus swing the lower end of the post rearwardly or toward the fireplace until the desired rigidity is obtained through the compression of spring 17. A handle 27 on the lower section 2 adjacent to the spring 17, and on the forward side of the section, is adapted to be grasped by a hand for pulling the lower end of the strip forwardly and free from the fireplace. Handle 16 on member 13 is convenient for both positioning the upper end of the channel strip and for carrying the post when not in use, and it may also be used in withdrawing the post, although the lower handle 27 is normally used for that purpose.

If the length of the post is adjusted so that there is a slight incline of the upper end toward the inside of the fireplace, as seen in FIG. 1, when the post is solid, there can be no chance of the lower end being accidentally swung past a vertical of the post, and into the fireplace, and also, a sufficient inclination is given to the holder 25 so that fat in the meat will drain away from the handle and onto the coals where it is burned. However, some inclination of the food holder will follow due to the vertical width of recesses 20.

It will be seen that the food holder and handle may quickly be adjusted to any desired level and can be quickly removed from the post for inspection of the food, and for turning the grill to invert the position of the meat.

When a broiling or cooking job is completed, the holder may be removed and carried bodily to the plates where the food may be transferred from the holder to the plates and also the post can be instantly removed and stored.

Where it is undesirable to start a fire in the fireplace, a fuel holder or pan 30 having an elongated handle 31 projecting therefrom may be supported in recesses below the one that supports the food holder, and at the desired distance below the latter. Charcoal may be held in pan 30 for broiling the meat or other food in the food holder.

The handle on the fuel holder may be similar to the handle on the food holder, such as a pair of horizontally spaced parallel relatively heavy wires connected by a U-bend at their ends remote from pan 30, or any other suitable handle.

In the structure as described, the degree of heat can readily be adjusted by positioning the food holder closer to the coals, or more distant, or where holder 30 is used, by positioning the coals closer to the food or farther from it, or the handle of the holder may be slid longitudinally thereof in the recesses 20 to move the holder to different horizontal positions over the coals.

The food can readily be entirely removed from the heat or proximity to the coals and there is no injury or defacement of the fireplace.

It is the intention that the claims appended hereto cover all changes and modifications of the example of the invention herein chosen for the purpose of the disclosure, which do not constitute departures from the spirit and scope of the invention.

I claim:

1. A device adapted to be removably held in the forward portion of a fireplace and which portion has upper and lower generally vertically facing opposed sides and laterally facing horizontally spaced opposed sides defining an opening into said fireplace, and a forwardly facing surface along said upper side and which device is adapted to support within said fireplace a food holder having an elongated horizontally extending handle projecting from one side thereof, said device comprising: an elongated, vertically extending, laterally opening channel strip providing a bottom wall and spaced opposed sidewalls extending longitudinally thereof with said sidewalls terminating in laterally facing free edges remote from said bottom wall, separate upper and lower means respectively secured to the upper and lower ends of said strip adapted to engage said upper and lower sides of said fireplace respectively for holding said strip in a generally vertically extending position within said opening into said fireplace with said free edges adapted to face one of the lateral sides of said fireplace; said sidewalls of said channel strip being formed with substantially horizontally aligned pairs of recesses opening outwardly of said free edges at one of their ends, each of the recesses of each aligned pair thereof having upper and lower edges spaced one over the other a sufficient distance for moving the horizontally extending handle of such food holder through the open ends of the recesses of each horizontally aligned pair to a position between the upper and lower edges of each recess of each such pair and for removal of such handle through said open ends free from tilting said handle in any direction relative to horizontal, an upper and a lower edge of a recess of each horizontally aligned pair thereof being adapted to engage the upper and lower sides of such handle at points on said handle spaced longitudinally thereof when the latter is substantially horizontal and within the recesses of one said horizontally aligned pairs for holding said handle horizontal, said upper means including a vertically elongated adjustable strip disposed between said sidewalls of said channel strip and against said bottom wall of the latter and substantially in slidable engagement with said bottom wall and said sidewalls of said channel strip for vertical reciprocable movement relative to said channel strip to an adjusted position projecting upwardly from the upper end of said channel strip, means for releasably securing said channel strip and said adjustable strip together in said adjusted position, a horizontally disposed plate secured to the upper end of said adjustable strip adapted to engage the upper side of said fireplace and stop means integral with said plate projecting upwardly from an edge thereof adapted to engage said forwardly facing surface of said forward portion of said fireplace to support the upper end of said channel strip against falling into said fireplace when said lower means is against said lower side of said fireplace.

2. A device adapted to be removably held in the forward portion of a fireplace and which portion has upper and lower generally vertically facing opposed sides and laterally facing horizontally spaced opposed sides defining an opening into said fireplace, and a forwardly facing surface along said upper side and which device is adapted to support within said fireplace a food holder having an elongated horizontally extending handle projecting from one side thereof, said device comprising; an elongated, vertically extending, laterally opening channel strip providing a bottom wall and spaced opposed sidewalls extending longitudinally thereof with said sidewalls terminating in laterally facing free edges remote from said bottom wall, separate upper and lower means respectively secured to the upper and lower ends of said strip adapted to engage said upper and lower sides of said fireplace respectively for holding said strip in a generally vertically extending position within said opening into said fireplace with said free edges adapted to face one of the lateral sides of said fireplace; said sidewalls of said channel strip being formed with substantially horizontally aligned pairs of recesses opening outwardly of said free edges at one of their ends, each of the recesses of each aligned pair thereof having upper and lower edges spaced one over the other a sufficient distance for moving the horizontally extending handle of such food holder through the open ends of the recesses of each horizontally aligned pair to a position between the upper and lower edges of each recess of each such pair and for removal of such handle through said open ends free from tilting said handle in any direction relative to horizontal, an upper and lower edge of a recess of each horizontally aligned pair thereof being adapted to engage the upper and lower sides of such handle at points on said handle spaced longitudinally thereof when the latter is substantially horizontal and within the recesses of one of said horizontally aligned pairs for holding said handle horizontal, said lower means comprising spaced, horizontally elongated floor engaging portions adapted to slidably engage said lower side of said forward portion of said fireplace for slidable movement longitudinally of said portions toward and away from the opening into said fireplace and means yieldably connecting said floor engaging portions with the lower end of said strip for yieldably holding said upper means against the upper side of said forward portion of said fireplace and for yieldably holding said strip within said opening into said fireplace when said floor engaging portions are substantially within said last mentioned opening and said upper means is in engagement with the upper side of said forward portion of said fireplace.

3. A device adapted to be removably held in the forward portion of a fireplace and which portion has upper and lower generally vertically opposed sides with a horizontally facing forward surface adjoining said upper side and laterally facing horizontally spaced opposed sides, defining an opening into said fireplace and which device is adapted to support within said fireplace a food holder having an elongated horizontally extending handle projecting from one side thereof, said device comprising: an elongated, vertically extending post, separate upper and lower means respectively secured to the upper and lower ends of said post adapted to engage said upper and lower sides of said fireplace respectively for securely holding said post in a generally vertically extending position within said opening into said fireplace, said post having a pair of vertically extending, horizontally spaced opposed sidewalls and means rigidly connecting them; said sidewalls of said post being formed with substantially horizontally aligned pairs of horizontally extending recesses opening laterally outwardly of a side of said post at one of their ends with their opposite ends terminating at points within said sidewalls, each of the recesses of each aligned pair thereof having upper and lower edges spaced one over the other a sufficient distance for moving the horizontally extending handle of such food holder through the open ends of the recesses of each horizontally aligned pair to a position between the upper and lower edges of the recess of each such pair thereof and for removal of such handle through said open ends free from tilting said handle in any direction relative to horizontal, an upper and a lower edge of a recess of each horizontally aligned pair thereof being adapted to engage the upper and lower sides of such handle at points on said handle spaced longitudinally thereof when the latter is substantially horizontal and within the recesses of one of said horizontally aligned pairs for holding said handle horizontal, and positioning and holding means on said upper means adapted to engage said horizontally facing forward surface for holding said post stationary against rotation thereof about its longitudinally extending axis and for positioning said post between said horizontally spaced opposed sides of said forward portion of said fireplace with the open ends of said recesses adapted to be directed toward one of said horizontally spaced opposed sides of said forward portion of said fireplace.

References Cited in the file of this patent

UNITED STATES PATENTS

| | | |
|---|---|---|
| 670,144 | Bond | Mar. 19, 1901 |
| 2,523,200 | Durst | Sept. 19, 1950 |
| 2,629,315 | Schaar | Feb. 24, 1953 |
| 2,698,726 | Howe | Jan. 4, 1955 |
| 2,777,660 | Albrecht | Jan. 15, 1957 |

FOREIGN PATENTS

| | | |
|---|---|---|
| 501,633 | Germany | July 3, 1930 |
| 1,012,520 | France | Apr. 16, 1952 |